(12) United States Patent
Maquin et al.

(10) Patent No.: US 7,704,902 B2
(45) Date of Patent: Apr. 27, 2010

(54) GLASS FIBRE COMPOSITIONS

(75) Inventors: Bertrand Maquin, Paris (FR); Jérôme Lalande, Champigny sur Marne (FR); Yannick Lefrere, Malkoff (FR)

(73) Assignee: Saint-Gobain Isover, Courbevoie (FR)

( * ) Notice: Subject to any disclaimer, the term of this patent is extended or adjusted under 35 U.S.C. 154(b) by 17 days.

(21) Appl. No.: 11/910,344

(22) PCT Filed: Mar. 31, 2006

(86) PCT No.: PCT/FR2006/050281

§ 371 (c)(1),
(2), (4) Date: Apr. 1, 2008

(87) PCT Pub. No.: WO2006/103376

PCT Pub. Date: Oct. 5, 2006

(65) Prior Publication Data

US 2008/0182317 A1   Jul. 31, 2008

(30) Foreign Application Priority Data

Apr. 1, 2005  (FR) .................................. 05 50861

(51) Int. Cl.
*C03C 13/06* (2006.01)
*C03C 13/00* (2006.01)
*C03C 3/089* (2006.01)
*C03C 3/091* (2006.01)
*C03C 3/087* (2006.01)
*D04H 1/00* (2006.01)
*D04H 3/00* (2006.01)
*D04H 1/74* (2006.01)

(52) U.S. Cl. .............................. 501/36; 501/35; 501/65; 501/66; 501/70; 442/331; 442/367

(58) Field of Classification Search ................... 501/35, 501/36, 37, 65, 70, 95.1; 442/331, 367
See application file for complete search history.

(56) References Cited

U.S. PATENT DOCUMENTS

| 2,664,359 | A | | 12/1953 | Dingledy et al. | |
| 4,434,592 | A | * | 3/1984 | Reneault et al. | 52/145 |
| 6,136,735 | A | * | 10/2000 | Gallo et al. | 501/36 |
| 6,156,683 | A | * | 12/2000 | Grove-Rasmussen et al. | 501/35 |
| 6,284,684 | B1 | | 9/2001 | Vignesoult et al. | |
| 6,313,050 | B1 | * | 11/2001 | De Meringo et al. | 501/36 |
| 6,897,173 | B2 | * | 5/2005 | Bernard et al. | 501/36 |
| 2003/0015003 | A1 | * | 1/2003 | Fisler et al. | 65/482 |
| 2003/0181306 | A1 | | 9/2003 | Bernard et al. | |

FOREIGN PATENT DOCUMENTS

| EP | 0 998 432 | 7/2003 |
| FR | 1 057 552 | 3/1954 |
| JP | 62 17041 | 1/1987 |
| WO | 03 050054 | 6/2003 |

* cited by examiner

*Primary Examiner*—Karl E Group
*Assistant Examiner*—Noah S Wiese
(74) *Attorney, Agent, or Firm*—Oblon, Spivak, McClelland, Maier & Neustadt, L.L.P.

(57) ABSTRACT

The invention relates to glass fibers having a chemical composition that contains the following constituents in the limits defined hereafter and expressed in percentage by weight, namely: 38 to 49 $SiO_2$; 15 to 25 $Al_2O_3$; 1 to 15 CaO; 0 to 4 MgO; 14 to 25 $Na_2O$; 0 to 10 $K_2O$; 0 to 8 $B_2O_3$; 0 to 3 $Fe_2O_3$; and 0 to 3 $P_2O_5$.

9 Claims, No Drawings

GLASS FIBRE COMPOSITIONS

The present invention relates to the field of glass fibers or mineral fibers exhibiting a high rate of dissolution in a physiological medium. It relates more particularly to novel glass compositions capable of forming fibers, in particular in the form of mineral wools for thermal and/or acoustic insulation or for substrates for soilless culture or in the form of continuous glass strands intended to reinforce organic and/or inorganic materials or which can be used as textile yarns.

Mineral fibers are capable, when certain geometrical criteria in terms of diameter and/or length are observed, of being introduced by inhalation into the body and in particular into the lungs, sometimes as far as the pulmonary alveoli. In order to avoid any pathogenic risk related to possible accumulation of fibers in the body, it turned out to be necessary to take care that these fibers should exhibit a low "biopersistence", that is to say can be easily and rapidly removed from the body. The chemical composition of the fibers is a major parameter influencing this ability to be rapidly removed from the body as it plays a considerable role in the rate of dissolution of the fibers in a physiological medium. Mineral fibers exhibiting high rates of dissolution in a physiological medium ("biosoluble") have thus been formulated and described in the prior art.

However, the main difficulty consists in increasing the rate of dissolution of the fibers in a physiological medium while retaining a procedure which is feasible industrially and in particular a good ability to be fiberized and the good operational properties of the finished product. The properties which influence the industrial feasibility include most importantly the viscosity and the devitrification properties (liquidus temperature and crystallization rates). The most important operational properties are mechanical strength (mainly the Young's modulus or elastic modulus and the tenacity), resistance to high temperatures and resistance to moisture or hydrolytic stability. The latter point is particularly crucial and problematic as the two criteria of hydrolytic stability and of biosolubility are in numerous respects contradictory since they both relate to the ability to dissolve in a predominantly aqueous medium. The requirements in terms of resistance to moisture are, however, increasingly high in numerous applications, in particular in the field of glass wools used in the preparation of panels for the construction industry, in particular sandwich panels, in which the mineral wool constitutes an insulating core between two metal panels (for example made of steel or aluminum). This is because it is important for the mechanical strength and in particular the tensile strength of these products subjected to ambient moisture not to become weaker with time. These various requirements are specified in particular in the draft standard prEN 14509, "Self-supporting double skin metal faced insulating sandwich panels—Factory made products—Specification".

The patent document FR 2 650 821 discloses biosoluble compositions formed of mineral wool of the "glass" type exhibiting, however, good properties of resistance to moisture of the order of 16 to 25 mg/g (expressed in "DGG" values), i.e. close to the values obtained for the non-biosoluble reference composition. Patent EP 1 218 304 also discloses biosoluble compositions formed of glass wool exhibiting DGG dissolution values of the order of 24 to 32 mg/g. However, such values prove to be still too high due to certain current requirements: the tensile strength under the conditions specified in the abovementioned draft standard prEN 14509 is in particular inadequate.

The aim of the invention is thus to provide novel glass compositions capable of forming fibers exhibiting high rates of dissolution in a physiological medium and a very high hydrolytic strength (very low "DGG" values), as well as a good ability to be fiberized and good properties of mechanical strength (in particular after aging in a humid environment) and resistance to high temperatures.

A subject matter of the invention is glass fibers exhibiting a chemical composition comprising the following constituents within the limits defined below, expressed as percentages by weight:

| | |
|---|---|
| $SiO_2$ | 38 to 49 |
| $Al_2O_3$ | 15 to 25 |
| $CaO$ | 1 to 15 |
| $MgO$ | 0 to 4 |
| $Na_2O$ | 14 to 25, preferably 14 to 23 |
| $K_2O$ | 0 to 10 |
| $B_2O_3$ | 0 to 8 |
| $Fe_2O_3$ | 0 to 3 |
| $P_2O_5$ | 0 to 3 |

Silica is an oxide which forms a glass network and plays an essential role in its stability, both thermal and chemical. In the context of the limits defined above, a percentage of silica of less than 38% could result in an excessively low viscosity and an excessively high ability to devitrify (that is to say, to crystallize) during the fiberizing stage. This point is crucial whatever the fiberizing process employed, in particular processes for fiberizing by the internal centrifugal technique and by drawing continuous yarns. On the other hand, an excessively high content, of greater than 49%, would result in an excessively high viscosity. The silica content is also limited as this oxide has proven to be harmful to the biosolubility in an acidic medium. It is thus preferably less than or equal to 48%, indeed even 47%.

Alumina plays a particularly important role in the context of the present invention. As network-forming component, this oxide plays an essential role with regard to the thermal stability and the mechanical strength. Its advantage also lies in its ability to improve the hydrolytic strength at the same time as the rate of dissolution in an acidic medium (and thus the biosolubility of the glass). For these reasons, the alumina content must not be less than 15%. However, as alumina has an effect in increasing the viscosity and the liquidus temperatures, its content must not exceed 25% and is even advantageously less than or equal to 24%, indeed even 23%.

Alkali metal oxides play a role in modifying the glass network, that is to say that they fit into the glass structure by breaking certain covalent bonds produced between the network-forming components. Like alumina, they have many effects in the present invention. Sodium oxide has a role as viscosity reducer and thus makes it possible to reduce the viscosity of the glass, facilitating the forming, excessively high fiberizing temperatures drastically reducing the lifetime of the fiberizing members. For this reason, the sodium oxide content must not be less than 14% and is advantageously greater than or equal to 15%, indeed even 16%. However, it has a negative effect on the hydrolytic strength and its content must therefore be less than or equal to 25%, preferably less than or equal to 24% and even 23%. The glasses obtained nevertheless prove to be highly resistant to moisture, which is particularly surprising and unexpected in view of the very high contents of alkali metal oxides and particularly of sodium oxide of the glasses according to the invention. The introduction of potassium oxide makes it possible to reduce the liquidus temperature while reducing the viscosity of the glass, which contributes to improving the ability to be fiberized and thus the quality of the fiberized products. For this reason, potassium oxide is advantageously present at contents of greater than or equal to 2%, indeed even 3% and even 4%. Due to the rarity of potassium-rich starting materials, the potassium content is limited to 10% and even preferably is less than or equal to 9%, indeed even 8%. In addition, it has proven to be the case that, in contrast to sodium oxide, potassium oxide does not improve the biosolubility of the glasses in this specific range of compositions, which contributes to limiting the content of this oxide in order to favor, in contrast, the introduction of sodium oxide.

Alkaline earth metal oxides, mainly CaO and MgO, also act as modifiers of the glass network. Their presence is beneficial with regard to the properties of biosolubility and of resistance to moisture (for this latter property, in comparison with sodium oxide). In terms of biosolubility, the presence of MgO has proven to be even more advantageous than that of CaO. The MgO content of the glasses according to the invention is thus preferably greater than or equal to 1%. The viscosity at high temperature of the glasses is also reduced by the introduction of these oxides but to a lesser extent than by the introduction of sodium oxide. In terms of devitrification, however, these two oxides have a different, indeed even sometimes contrasting, role. While the introduction of CaO in moderate contents (from 3 to 10%) makes it possible to obtain a reduction in the liquidus temperatures, in particular when it replaces sodium oxide, which is entirely unexpected, magnesium oxide, in contrast, very strongly increases these same temperatures. For this reason, the MgO absolutely has to be less than 4% and preferably less than or equal to 3.5%, indeed even 3%. For high CaO contents, however, the liquidus temperature strongly increases. The CaO content is thus advantageously less than or equal to 14% and even 12%, indeed even 10%.

Boron oxide is advantageous in reducing the viscosity of the glass and improving the biosolubility of the fibers. In addition, its presence tends to improve the thermal insulation properties of the mineral wool, in particular by lowering its thermal conductivity coefficient in its radiative component. On the other hand, it appears to increase the liquidus temperatures, which is rather surprising. In addition, due to its high cost and its ability to volatilize at high temperature, resulting in noxious fumes and requiring the production sites to be equipped with flue gas reprocessing plants, the boron oxide content is less than or equal to 8% and preferably less than or equal to 7% and even 6%.

Iron oxide is limited to a content of less than 3% due to its role with regard to the coloring of the glass but also with regard to the property of the glass of devitrifying. A high iron content makes it possible to confer a resistance to very high temperature on the mineral wools of the "rock wool" type but renders the fiberizing by the internal centrifugal technique difficult, indeed even impossible in some cases.

Phosphorus oxide ($P_2O_5$) can advantageously be used, in particular due to its beneficial role on the biosolubility. However, its content is advantageously limited to 2%, indeed even 1%. Due to its cost and to its negative effect on the viscosity of the glass, the glasses according to the invention preferably do not comprise phosphorus oxide, except for inevitable traces originating from the starting materials.

The fibers according to the invention can also comprise other oxides, in a content by weight generally not exceeding 3%, indeed even 2% and even 1%. These oxides include the impurities commonly introduced by the natural or artificial starting materials (for example recycled glass, referred to as cullet) used in this type of industry (the commonest include $TiO_2$, MnO, BaO, and the like). Impurities such as $ZrO_2$ are also commonly introduced by the partial dissolution in the glass of chemical elements originating from the refractory materials used in the construction of the furnaces. Some traces also originate from the compounds employed for the refining of the glass: mention may in particular be made of the sulfur oxide $SO_3$ which is very commonly employed. Alkaline earth metal oxides, such as BaO or SrO, and/or alkali metal oxides, such as $Li_2O$, can be deliberately included in the fibers according to the invention. However, due to their cost, it is preferable for the fibers according to the invention not to comprise them. These various oxides, due to their low content, do not in any case play any particular functional role which could modify the way in which the fibers according to the invention respond to the problem posed.

According to a first embodiment, the glass fibers according to the invention are provided in the form of a mineral wool of "glass wool" type which can be obtained by an internal centrifugal process, that is to say by having recourse to centrifuges ("spinners") rotating at high speed and pierced by orifices.

In this case, it is preferable for the liquidus temperature, which sets the lower temperature limit at which it is possible to fiberize the glass, to be less than 1150° C., in particular less than 1100° C., indeed even 1060° C. This is because higher temperatures would involve an unacceptable limitation on the lifetime of the fiberizing spinners, indeed even a modification to the constitutive materials of said spinners. In order to obtain fibers of good quality and to ensure operation of the plants, the forming range, that is to say the difference between the temperature at which the viscosity of the glass is at 1000 poises and the liquidus temperature, is preferably greater than or equal to 0° C., advantageously greater than or equal to 10° C., in particular 25° C., indeed even 50° C. and even 100° C. The glass wools according to the invention preferably exhibit DGG dissolution values of less than 18 mg/g, in particular of less than or equal to 16 mg/g, indeed even 12 mg/g and even 10 mg/g.

In order to achieve a combination of such properties, an optimization of the composition has made it possible to result in a particularly preferred range.

The silica content is advantageously greater than or equal to 40%, indeed even 42% and even 44%. It is preferably less or equal to 48%, indeed even 47%, or also 46.7% or 46.5%, and even 46%. This is because silica is an oxide which increases the resistance of the glasses to acids and thus reduces the biosolubility of the fibers in an acidic medium. An excessively low content would, on the other hand, involve a low stability with regard to devitrification.

In view of the various influences of alumina recounted above and in particular its strong influence on the liquidus temperature, on the other hand, and the biosolubility, on the other hand, the alumina content is advantageously greater than or equal to 18%, in particular 18.5%, and less than or equal to 22%, indeed even 21% and even 20%. A particularly preferred range lies between 18 and 20%, for which very low DGG dissolution values are obtained.

In view of the conflicting roles of silica and alumina with regard to the biosolubility in an acidic medium, it has been observed that the highest biosolubility values were obtained on setting the $SiO_2/Al_2O_3$ ratio between 2.0 and 2.5, preferably between 2.2 and 2.4.

The contents of sodium oxide are advantageously greater than or equal to 15%, in particular 16%, indeed even 16.5%, and less than or equal to 22%, indeed even 21%, mainly due to its action as viscosity reducer. However, the lowest DGG dissolution values are obtained when the content of sodium oxide is less than or equal to 20%, indeed even 19% or 18.5%. In view of its beneficial role with regard to the liquidus temperature, potassium oxide is preferably present in proportions of greater than or equal to 4%, indeed even 4.5%, and less than or equal to 6%, in particular 5.5%. The total content of alkali metal oxides is advantageously greater than or equal to 21%, indeed even 22%. Despite these particularly high values, the glasses according to this embodiment exhibit, surprisingly, extremely low DGG dissolution values.

Calcium oxide is present in the composition according to the invention in a content advantageously of greater than or equal to 4%, indeed even 5%, and less than or equal to 10%, in particular 8.5%, indeed even 8% and in particular 7%. Its introduction at the expense of sodium oxide has proven to be amazingly beneficial with regard to the liquidus temperature. Magnesium oxide, due to its influence on the liquidus temperature, is preferably present in proportions of less than or equal to 3.5%, indeed even 3.2%. Due to its influence on the biosolubility, its content is advantageously greater than or equal to 1%.

The content of boron oxide is advantageously less than or equal to 5%, indeed even 4.5%, and greater than or equal to 3% (due to its beneficial role with regard to the biosolubility).

Iron oxide is advantageously present in contents of between 0 and 3%, in particular between 1 and 3% and especially of the order of 2%. This is because the presence of iron oxide makes it possible to limit the corrosion of the fiberizing spinners by the hot glass.

The mineral wools according to the invention preferably exhibit a composition comprising the following constituents within the limits defined below, expressed as percentages by weight:

| | |
|---|---|
| $SiO_2$ | 40 to 48 |
| $Al_2O_3$ | 18 to 22 |
| CaO | 1 to 8.5 |
| MgO | 0 to 3.5 |
| $Na_2O$ | 15 to 22 |
| $K_2O$ | 0 to 6 |
| $B_2O_3$ | 0 to 6 |
| $Fe_2O_3$ | 0 to 3 |
| $P_2O_5$ | 0 to 3 |

A preferred composition comprises the following constituents within the limits defined below, expressed as percentages by weight:

| | |
|---|---|
| $SiO_2$ | 44 to 46.7 |
| $Al_2O_3$ | 18 to 21 |
| CaO | 1 to 8 |
| MgO | 0 to 3.5 |
| $Na_2O$ | 15 to 21, in particular 16 to 21 |
| $K_2O$ | 3 to 6 |
| $B_2O_3$ | 0 to 5 |
| $Fe_2O_3$ | 0 to 3 |
| $P_2O_5$ | 0 to 3 |

Such a composition exhibits an increased biosolubility, a positive forming range and DGG dissolution values as far as approximately 16 mg/g.

A particularly preferred composition according to the invention comprises the following constituents within the limits defined below, expressed as percentages by weight:

| | |
|---|---|
| $SiO_2$ | 44 to 46 |
| $Al_2O_3$ | 18 to 20 |
| CaO | 4 to 8 |
| MgO | 1 to 3.2 |
| $Na_2O$ | 16.5 to 18.5 |
| $K_2O$ | 4 to 5 |
| $B_2O_3$ | 3 to 5 |
| $Fe_2O_3$ | 0 to 3 |
| $P_2O_5$ | 0 to 3 |

This is because such a composition makes it possible to combine DGG dissolution values of less than 10 mg/g, indeed even of less than 9 mg/g, with very high rates of dissolution in a physiological medium and a forming range of greater than 10° C.

Another particularly preferred family of compositions comprises the following constituents within the limits defined below, expressed as percentages by weight:

| | |
|---|---|
| $SiO_2$ | 46 to 48 |
| $Al_2O_3$ | 18 to 20 |
| CaO | 5 to 10 |
| MgO | 0 to 1 |
| $Na_2O$ | 14 to 16.5 |
| $K_2O$ | 4 to 6 |
| $B_2O_3$ | 3 to 5 |
| $Fe_2O_3$ | 1 to 3 |
| $P_2O_5$ | 0 to 3 |

These compositions make it possible to obtain DGG values of the order of 10 mg/g, indeed even less, high forming ranges (more than 50° C.) and suitable rates of dissolution in a physiological medium, in particular greater than or equal to 20 000 ng/cm²·h but lower than those obtained by the compositions more depleted in $SiO_2$ and richer in $Na_2O$ described above.

According to a second embodiment, the fibers according to the invention are provided in the form of glass strands capable of being produced by a process consisting in mechanically drawing molten glass streams flowing from orifices positioned at the base of a bushing generally heated by the Joule effect according to the following process: a multiplicity of molten glass streams flowing from a multiplicity of orifices positioned at the base of one or more bushings is drawn in the form of one or more sheets of continuous filaments and then gathered together into one or more strands collected on a moving support. It can be a rotating support, when the strands are collected in the form of wound packages, or a support moving translationally, when the yarns are cut by a device which also serves to draw them or when the stands are thrown by a device which serves to draw them, so as to form a mat. The strands obtained, optionally after other conversion operations, can thus be provided in various forms: continuous strands, cut strands, braids, tapes, mats, networks, and the like, these strands being composed of filaments with a diameter which can range from 5 to 30 microns approximately.

The fibers then preferably exhibit a liquidus temperature of less than 1250° C., in particular 1200° C., and a forming range, expressed as being the difference between the temperature at which the glass exhibits a viscosity of 1000 poises ("T log 3") and the liquidus temperature, of greater then 60° C., in particular 75° C. and even 100° C.

In view of the reduced limitation with regard to the liquidus temperature but the greater constraint with regard to the forming range, a first family of preferred fibers exhibits a rather high alumina content, of greater than or equal to 20% and even 22%, a high lime content, of greater than or equal to 5%, indeed even 8% and even 10%, and a low content of alkali metal oxides, in particular of sodium oxide (content of less than or equal to 20% and even 18% or 16%). For its part, the content of potassium oxide is advantageously greater than or equal to 5%. The amount of magnesia is advantageously greater than or equal to 1%, indeed even 2%, while the content of boron oxide is preferably less than or equal to 5% and even 2%. It is preferable, for reasons of coloring, for the content of iron oxide to be less than or equal to 2% and even 1%. The silica content is advantageously greater than or equal to 40%, indeed even 45%. This first family of fibers exhibits a particularly high biosolubility but has to be fiberized at a fairly high temperature.

A second family of preferred glass fibers, for which the fiberizing temperature is favored with respect to the biosolubility values, comprises alumina at a lower content, of less than or equal to 19% and even 18%, silica at a level of at least 45%, indeed even 46%, a lime content of less than or equal to 5%, a magnesia content of less than or equal to 2%, a fairly high content of sodium oxide, of greater than or equal to 16% and less than or equal to 20%, potassium oxide at contents of between 2 and 6% and a low content of boron oxide, of less than or equal to 6%, preferably 3%. The content of iron oxide is advantageously less than or equal to 2%, indeed even 1%.

A further subject matter of the invention is thermal and/or acoustic insulation products comprising the glass fibers according to the invention, in particular structural parts of sandwich type in which the mineral wool constitutes an insulating core between two metal panels (for example made of steel or aluminum). These parts are used for the construction of internal or external walls or of roofs.

Another subject matter of the invention is a process for the manufacture of the fibers according to the invention. This process can consist in mechanically drawing molten glass streams flowing from orifices positioned at the base of a bushing generally heated by the Joule effect according to the following stages: a multiplicity of molten glass streams flowing from a multiplicity of orifices positioned at the base of one or more bushings is drawn in the form of one or more sheets of continuous filaments and then gathered together into one or more strands collected on a moving support. The process can also be of the "internal centrifugal technique" type, that is to say by resorting to centrifuges rotating at high speed and pierced by orifices, the fibers obtained subsequently being drawn by a gaseous stream.

A final subject matter of the invention is the use of the fibers according to the invention as thermal and/or acoustic insulation materials or soilless culture substrates, in particular in the preparation of construction systems of sandwich type in which the mineral wool constitutes an insulating core between two metal panels (for example made of steel or aluminum). The fibers according to the invention can finally be used as reinforcement for organic and/or inorganic materials or as textile yarns.

The advantages exhibited by the glass fibers according to the invention will be better appreciated through the following examples, which illustrate the present invention without, however, limiting it.

Glass compositions according to the invention and their properties are collated in table 1.

The composition of the glasses is expressed as percentages by weight of oxides. The inevitable impurities originating from the starting materials, the refining agents or the refractive materials of the furnace, some of which, besides, are not analyzed, have been transcribed only in their total content. It is clearly apparent to a person skilled in the art that these impurities, present at contents generally of less than 1%, indeed even 0.5%, in the examples which follow, do not play any functional role in the context of the present invention.

In order to illustrate the advantages of the glass compositions according to the invention, the following fundamental properties are presented in table 1:

the temperature corresponding to a viscosity of $10^2$ poises, recorded as "T log 2" and expressed in degrees Celsius, corresponding to the minimum temperature to which it is advisable to heat the glass bath in order to be able to obtain a homogeneous glass paste free from gas pockets, the temperature corresponding to a viscosity of $10^{2.5}$ poises, recorded as "T log 2.5" and expressed in degrees Celsius, the temperature corresponding to a viscosity of $10^3$ poises, recorded as "T log 3" and expressed in degrees Celsius, corresponding to the fiberizing temperature, the liquidus temperature, recorded as "Tliq", corresponding to the temperature below which the first crystals form, the forming range, corresponding to the difference between T log 3 and Tliq, recorded as "ΔT" and expressed in degrees Celsius, the "DGG" dissolution value, recorded as "DGG": according to this method, a powder formed of glass milled in order to form a powder with a particle size of 360 to 400 micrometers is immersed in water heated at reflux for 5 hours. After rapid cooling, the mixture is filtered and dry matter present in the filtrate is measured. The "DGG" dissolution value expresses the amount of dissolved material, expressed in milligrams, per gram of glass treated, the rate of dissolution in an acidic medium, recorded at "$kSiO_2$", representing the rate of dissolution of fibers with a diameter of 10 micrometers left for 6 hours in static saline solution buffered at a pH of 4.5. The saline solution comprises, in addition to the pH buffer, sodium chloride and sodium citrate in respective concentrations of 5 g/l and 0.15 g/l, the ratio of the glass surface area exposed to the volume of the etching solution being 0.5 $cm^{-1}$. This rate of dissolution, expressed in $ng/cm^2 \cdot h$, expresses the amount of glass dissolved per unit of surface area of fibers and per unit of time.

Example C1 is a comparative example of the "glass wool" type corresponding to example 3 of the document EP 1 218 304. This type of composition provides DGG dissolution values which are too high for certain applications, in particular for applications of the sandwich type, where the mineral wool panels are subject to high requirements in terms of resistance to moisture.

The examples according to the invention show that it is possible to improve this property while not sacrificing the properties of biosolubility and the ability to be fiberized. Examples 9, 10 and 12 to 15 show that it is even possible to reduce this property to values of less than 10 mg/g, this being achieved by a particular choice of the contents of silica, alumina and alkali metal oxides, while obtaining positive forming ranges, even forming ranges of greater than or equal to 10° C., and a rate of dissolution in an acidic medium of greater than 25 000 $ng/cm^2 \cdot h$.

Examples 1 and 2 show that silica is harmful to the biosolubility of the fibers, contents of greater than 47% being associated with $kSiO_2$ values of less than 15 000 $ng/cm^2 \cdot h$.

A surprising effect of sodium oxide in the context of the present invention lies in its effect of increasing the liquidus temperature. This effect stands out in particular on comparing examples 4 and 5, an increase in 2.3% in the content of sodium oxide, essentially compensated for with regard to the silica, bringing about an increase of 40° C. in the liquidus temperature. In the majority of known glasses, this oxide nevertheless has a completely opposite role. A possible explanation for this unexpected phenomenon might lie in the fact that the majority of the glasses according to the invention have a tendency to devitrify with the formation of crystals of "nepheline" type of formula $(Na,K)AlSiO_4$.

Contents of sodium oxide of greater than or equal to 18.5%, coupled with silica contents of less than or equal to 44% (and optionally alumina contents of greater than or equal to 20%), have as a consequence negative forming ranges, which is harmful to the fiberizing of the glasses, even if it does not render it impossible (kinetic factors, such as the rate of crystallization, intervene). Examples 4, 5, 8 and 11 illustrate this point.

Examples 17 to 20 and 22 show that the substitution of sodium oxide by lime makes it possible to advantageously improve the DGG dissolution value without modifying too substantially the ability to be formed or the $kSiO_2$ value. Examples 19, 20 and 22 are preferred in particular as they combine a high forming range (more than 50° C.) with a low DGG (10 mg/g or less) while exhibiting a suitable solubility in a physiological medium (more than 20 000 ng/cm²·h).

Sandwich panels comprising mineral wools, the compositions of which correspond to those of examples C1, 6, 9, 17 and 20 and the densities of which are close to 60 kg/m³, were subjected to the tensile strength test after aging in a humid environment described in the draft standard peEB 14509 "Self-supporting double skin metal faced insulating sandwich panels—Factory made products—Specification". According to this test, the sandwich panels are placed for 28 days in a climate-controlled box at 65° C. and 100% relative humidity and the loss in tensile strength after this aging stage must not exceed 60%.

The loss in tensile strength after aging (in %) is shown in table 2 below for each of the compositions tested.

TABLE 2

| Example | Loss in tensile strength (%) |
|---|---|
| C1 | 80-85% |
| 6 | 20-28% |
| 9 | 14-34% |
| 17 | 30% |
| 20 | 20-44% |

While the loss in tensile strength of comparative sample C1 testifies to its very poor resistance in a humid environment, samples 6, 9, 17 and 20 exhibit a loss in strength of much less than 60%. The glass fibers according to the invention thus exhibit a notably improved behavior in terms of resistance in a humid environment.

TABLE 1

|  | C1 | 1 | 2 | 3 | 4 | 5 | 6 | 7 | 8 | 9 | 10 |
|---|---|---|---|---|---|---|---|---|---|---|---|
| $SiO_2$ (%) | 63.4 | 47.9 | 47.3 | 44.7 | 42.2 | 40.0 | 44.4 | 44.2 | 43.9 | 46.0 | 44.9 |
| $Al_2O_3$ (%) | 1.7 | 18.1 | 16.8 | 19.0 | 20.0 | 20.1 | 19.0 | 19.0 | 18.8 | 18.8 | 18.9 |
| $Fe_2O_3$ (%) | 0.1 | 1.92 | 2.2 | 2.2 | 2.2 | 2.3 | 2.1 | 2.2 | 2.1 | 2.0 | 2.0 |
| CaO (%) | 6.8 | 3.45 | 3.8 | 4.3 | 4.8 | 4.6 | 4.3 | 4.3 | 6.2 | 6.2 | 6.15 |
| MgO (%) | 3.6 | 0.4 | 0.4 | 1.3 | 1.4 | 1.4 | 1.4 | 1.3 | 1.3 | 1.3 | 1.31 |
| $Na_2O$ (%) | 17.6 | 18 | 19.2 | 19.2 | 18.5 | 20.8 | 19.0 | 19.0 | 19.0 | 16.9 | 17.8 |
| $K_2O$ (%) | 0.9 | 4.45 | 4.5 | 4.5 | 4.8 | 5.0 | 5.2 | 4.5 | 4.5 | 4.5 | 4.5 |
| $B_2O_3$ (%) | 5.9 | 5.05 | 5.2 | 4.1 | 5.35 | 5.1 | 4.1 | 5.0 | 3.8 | 3.8 | 3.9 |
| Impurities |  | 0.7 | 0.6 | 0.7 | 0.75 | 0.7 | 0.5 | 0.5 | 0.4 | 0.5 | 0.5 |
| Tlog2 (° C.) |  | 1398 | 1355 | 1367 | 1362 | 1304 | 1367 | 1353 | 1322 | 1374 | 1353 |
| Tlog2.5 (° C.) |  | 1255 | 1213 | 1232 | 1225 | 1176 | 1232 | 1218 | 1194 | 1241 | 1220 |
| Tlog3 (° C.) |  | 1141 | 1100 | 1124 | 1117 | 1072 | 1123 | 1109 | 1092 | 1135 | 1114 |
| Tliq (° C.) |  | 1010 | 960 | 1070 | 1130 | 1170 | 1060 | 1080 | 1110 | 1060 | 1090 |
| ΔT (° C.) |  | 131 | 140 | 54 | −13 | −98 | 63 | 29 | −18 | 75 | 24 |
| DGG | 24 | 13.5 | 14.5 | 16.9 | 14.1 | 19.4 | 15.1 | 12.9 | 10.1 | 9.7 | 10.1 |
| $kSiO_2$ (×10³) |  | 12.4 | 5.1 | 25.0 | 37.3 | 57.5 | 24.3 | 29.8 | 41.8 | 24.6 | 30.6 |

|  | 11 | 12 | 13 | 14 | 15 | 16 | 17 | 18 | 19 | 20 | 21 | 22 |
|---|---|---|---|---|---|---|---|---|---|---|---|---|
| $SiO_2$ (%) | 43.7 | 46.0 | 44.9 | 44.9 | 45.0 | 43.0 | 46.5 | 46.6 | 46.6 | 46.7 | 46.8 | 46.7 |
| $Al_2O_3$ (%) | 18.8 | 18.8 | 18.9 | 19.8 | 19.7 | 20.0 | 18.0 | 18.0 | 18.0 | 18.0 | 18.1 | 18.1 |
| $Fe_2O_3$ (%) | 2.1 | 2.1 | 2.1 | 2.1 | 2.1 | 2.0 | 2.0 | 2.0 | 2.0 | 2.0 | 2.0 | 2.0 |
| CaO (%) | 4.2 | 4.2 | 4.3 | 6.3 | 4.2 | 8.2 | 5.5 | 6.4 | 7.35 | 8.3 | 4.4 | 9.2 |
| MgO (%) | 3.18 | 3.2 | 3.14 | 1.31 | 3.1 | 1.3 | 0.5 | 0.5 | 0.5 | 0.5 | 2.0 | 0.5 |
| $Na_2O$ (%) | 19.0 | 16.8 | 17.9 | 16.7 | 16.7 | 15.0 | 18.2 | 17.2 | 16.2 | 15.2 | 17.3 | 14.1 |
| $K_2O$ (%) | 4.5 | 4.2 | 4.5 | 4.5 | 4.5 | 6.5 | 5.35 | 5.35 | 5.35 | 5.35 | 5.4 | 5.4 |
| $B_2O_3$ (%) | 4.0 | 3.8 | 3.8 | 3.9 | 4.0 | 4.0 | 4.0 | 4.0 | 4.0 | 4.0 | 4.0 | 4.0 |
| Impurities | 0.5 | 0.9 | 0.5 | 0.7 | 0 | 0 | 0 | 0 | 0 | 0 | 0 | 0 |
| Tlog2 (° C.) | 1339 | 1383 | 1362 | 1375 | 1385 |  | 1344 | 1345 | 1343 | 1347 |  | 1352 |
| Tlog2.5 (° C.) | 1208 | 1252 | 1232 | 1244 | 1259 |  | 1214 | 1216 | 1218 | 1223 |  | 1230 |
| Tlog3 (C) | 1105 | 1146 | 1129 | 1139 | 1156 | 1150 | 1108 | 1111 | 1116 | 1123 |  | 1131 |
| Tliq (° C.) | 1130 | 1090 | 1110 | 1120 | 1130 | 1090 | 1050 | 1070 | 1060 | 1060 | 1060 | 1070 |
| ΔT (° C.) | −25 | 56 | 19 | 19 | 26 | 60 | 58 | 41 | 56 | 63 |  | 61 |
| DGG | 13.2 | 9.7 | 8.9 | 9.4 | 9.8 |  | 13.7 | 12.4 | 10.1 | 10.8 |  | 9.8 |
| $kSiO_2$ (×10³) | 45.7 | 25.0 | 37.3 | 28.3 | 30.8 |  | 21.3 | 21.6 | 21.1 | 20.9 | 20.5 | 23.0 |

What is claimed is:

1. A mineral wool, comprising a glass fiber having a chemical composition comprising the following constituents within the limits defined below, expressed as percentages by weight:

| | |
|---|---|
| $SiO_2$ | 40 to 48 |
| $Al_2O_3$ | 18 to 22 |
| CaO | 1 to 8.5 |
| MgO | 0 to 3.5 |
| $Na_2O$ | 15 to 22 |
| $K_2O$ | 0 to 6 |
| $B_2O_3$ | 0 to 6 |
| $Fe_2O_3$ | 0 to 3 |
| $P_2O_5$ | 0 to 3. |

2. The mineral wool as claimed in claim 1, wherein a total content of alkali metal oxides in the chemical composition of the glass fiber is greater than or equal to 21%.

3. The mineral wool as claimed in claim 1, wherein the chemical composition of the glass fiber comprises the following constituents within the limits defined below, expressed as percentages by weight:

| | |
|---|---|
| $SiO_2$ | 44 to 46.7 |
| $Al_2O_3$ | 18 to 21 |
| CaO | 1 to 8 |
| MgO | 0 to 3.5 |
| $Na_2O$ | 15 to 21 |
| $K_2O$ | 3 to 6 |
| $B_2O_3$ | 0 to 5 |
| $Fe_2O_3$ | 0 to 3 |
| $P_2O_5$ | 0 to 3. |

4. The mineral wool as claimed in claim 3, wherein the content of $Na_2O$ is between 16 and 21%.

5. The mineral wool as claimed in claim 4, wherein the chemical composition of the glass fiber comprises the following constituents within the limits defined below, expressed as percentages by weight:

| | |
|---|---|
| $SiO_2$ | 44 to 46 |
| $Al_2O_3$ | 18 to 20 |
| CaO | 4 to 8 |
| MgO | 1 to 3.2 |
| $Na_2O$ | 16.5 to 18.5 |
| $K_2O$ | 4 to 5 |
| $B_2O_3$ | 3 to 5 |
| $Fe_2O_3$ | 0 to 3 |
| $P_2O_5$ | 0 to 3. |

6. The mineral wool as claimed in claim 1, wherein the chemical composition of the glass fiber comprises the following constituents within the limits defined below, expressed as percentages by weight:

| | |
|---|---|
| $SiO_2$ | 46 to 48 |
| $Al_2O_3$ | 18 to 20 |
| CaO | 5 to 10 |
| MgO | 0 to 1 |
| $Na_2O$ | 14 to 16.5 |
| $K_2O$ | 4 to 6 |
| $B_2O_3$ | 3 to 5 |
| $Fe_2O_3$ | 1 to 3 |
| $P_2O_5$ | 0 to 3. |

7. A structural part, comprising the mineral wool as claimed in claim 1 as an insulating core between two metal panels.

8. A thermal and/or acoustic insulation material comprising the mineral wool as claimed in claim 1.

9. A soilless culture substrate comprising the mineral wool as claimed in claim 1.

* * * * *